United States Patent

[11] 3,613,865

[72] Inventor James L. Reimers
San Jose, Calif.
[21] Appl. No. 16,890
[22] Filed Mar. 5, 1970
[45] Patented Oct. 19, 1971
[73] Assignee FMC Corporation
San Jose, Calif.

[54] CONVEYING SYSTEM
10 Claims, 10 Drawing Figs.

[52] U.S. Cl. .................................................. 198/131,
198/152
[51] Int. Cl. ...................................................... B65g 15/00
[50] Field of Search .......................................... 198/131,
154, 155, 158, 25, 152; 99/360

[56] References Cited
UNITED STATES PATENTS
3,347,351 10/1967 Mencacci .................... 198/131
3,434,585 3/1969 Lee ............................ 198/152
3,452,858 7/1969 Reimers ..................... 198/152

FOREIGN PATENTS
1,233,778 2/1967 Germany ...................... 198/154

Primary Examiner—Richard Aegerter
Attorneys—F. W. Anderson, C. E. Tripp and A. J. Moore ABSTRACT: A conveying system for a hydrostatic cooker having carrier bars mounted on a processing conveyor of predetermined pitch, and having removable adapters for adapting carriers to controllably handle a wide range of container sizes, including easily deformable containers such as aluminum or plastic containers supported on their ends. The adapters are removably mounted on the carrier bars and have a curved camming surface adapted to cam containers that are supported on their ends into positions where they will not be pinched by the articulating carrier bars. The adapters may be of different sizes and/or may be mounted on only selected ones of the carrier bars so that a single-processing conveyor will be capable of simultaneously handling more than one size range of containers.

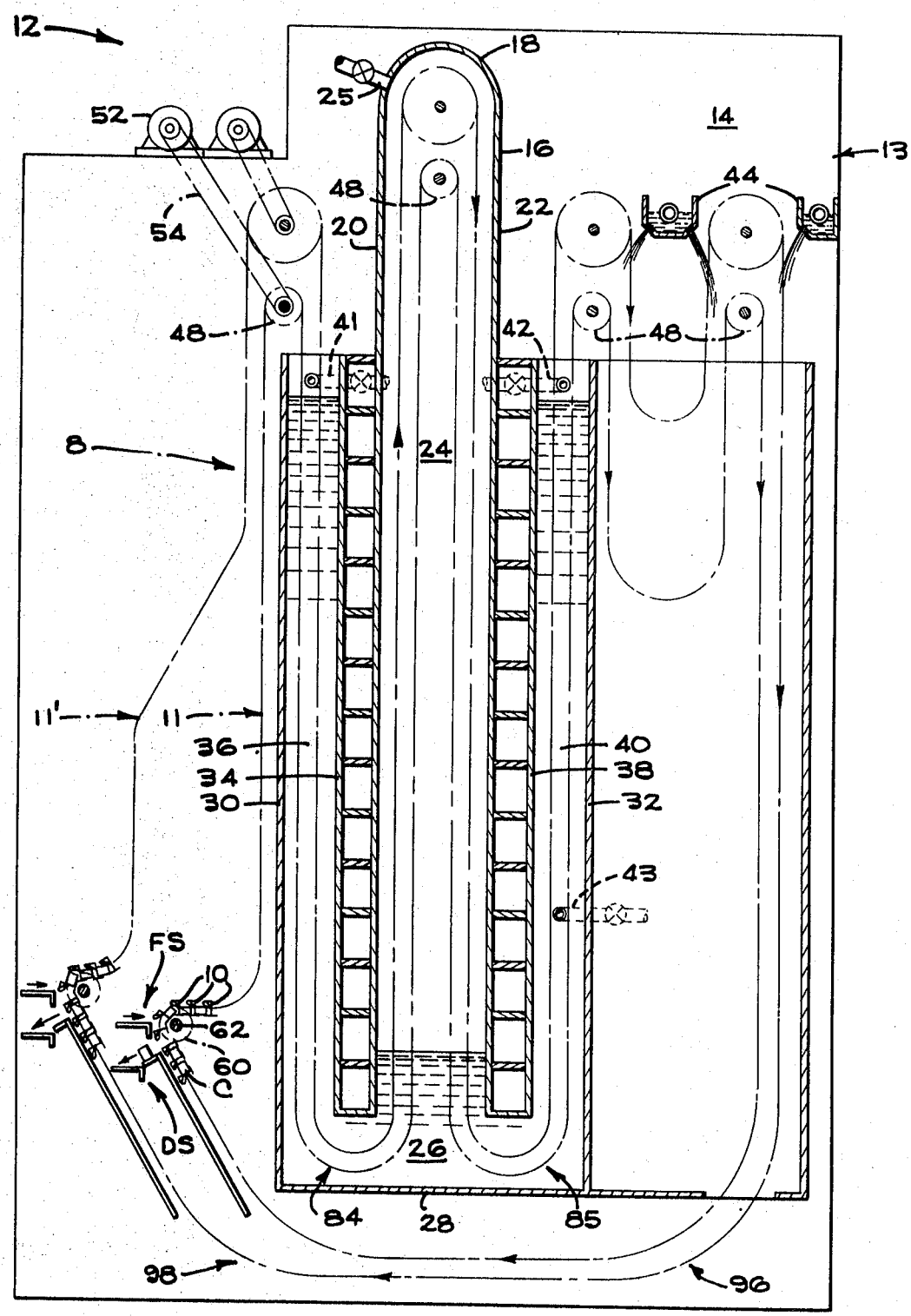
FIG_1

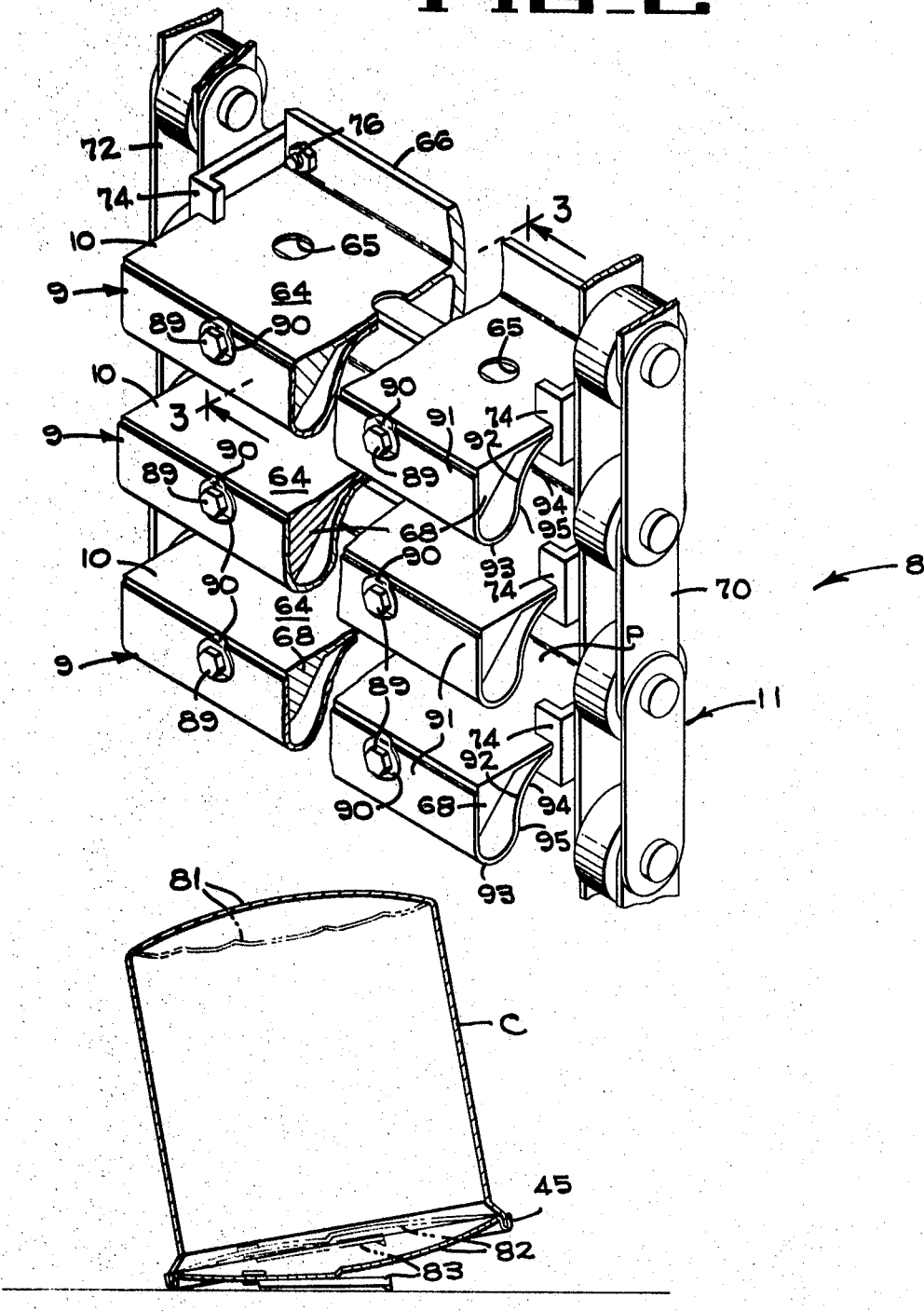

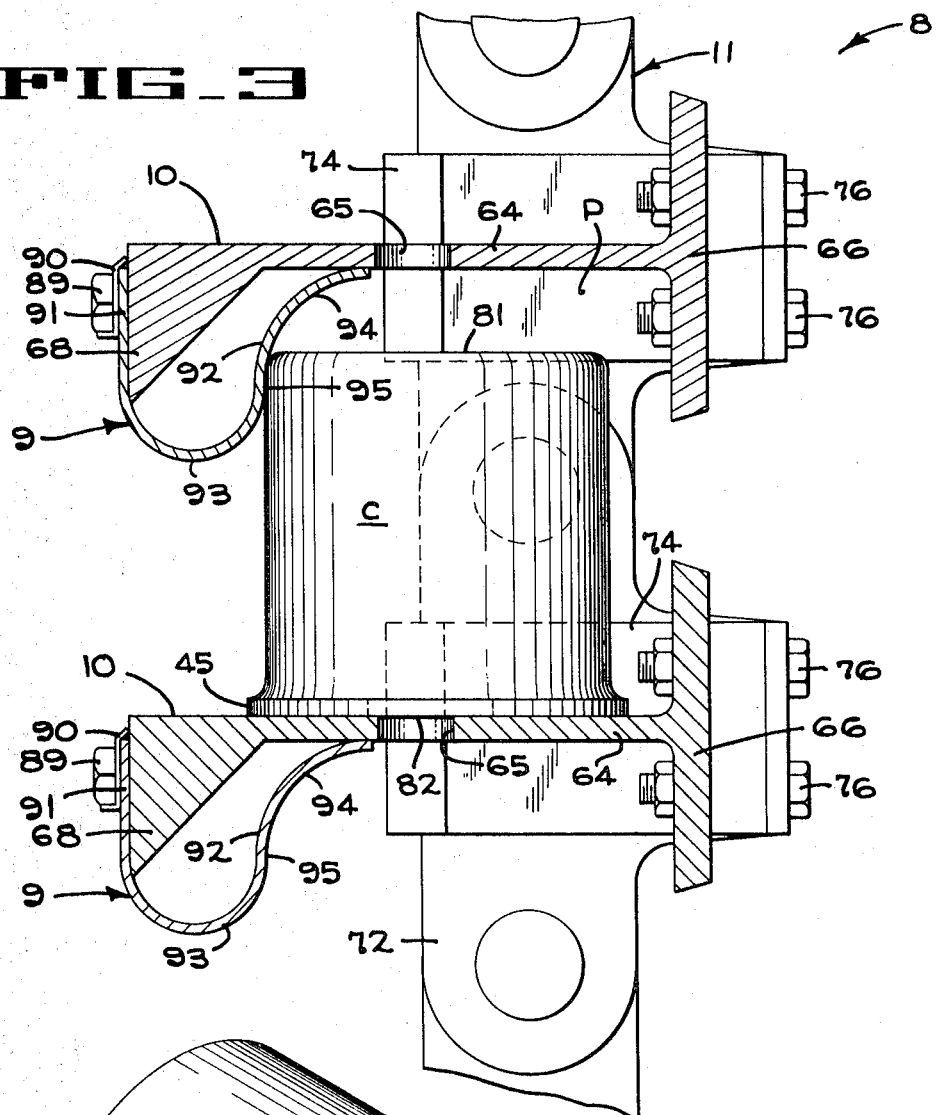
FIG_3
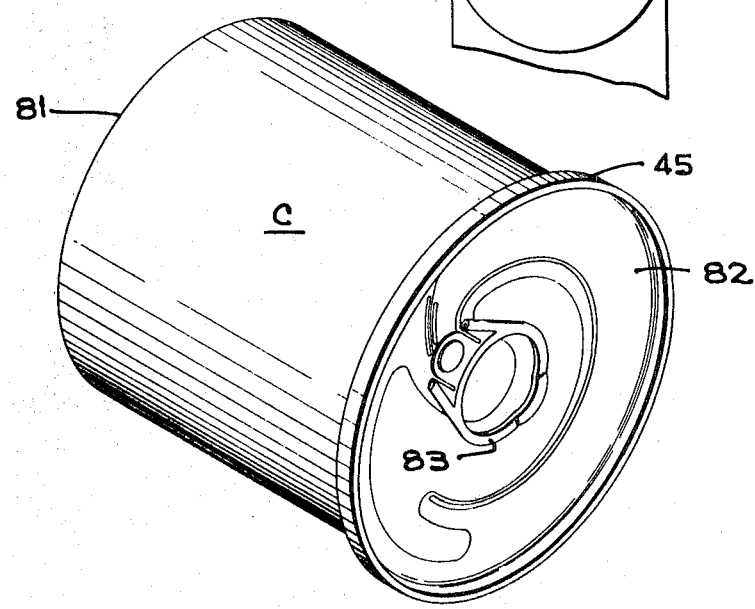
FIG_4

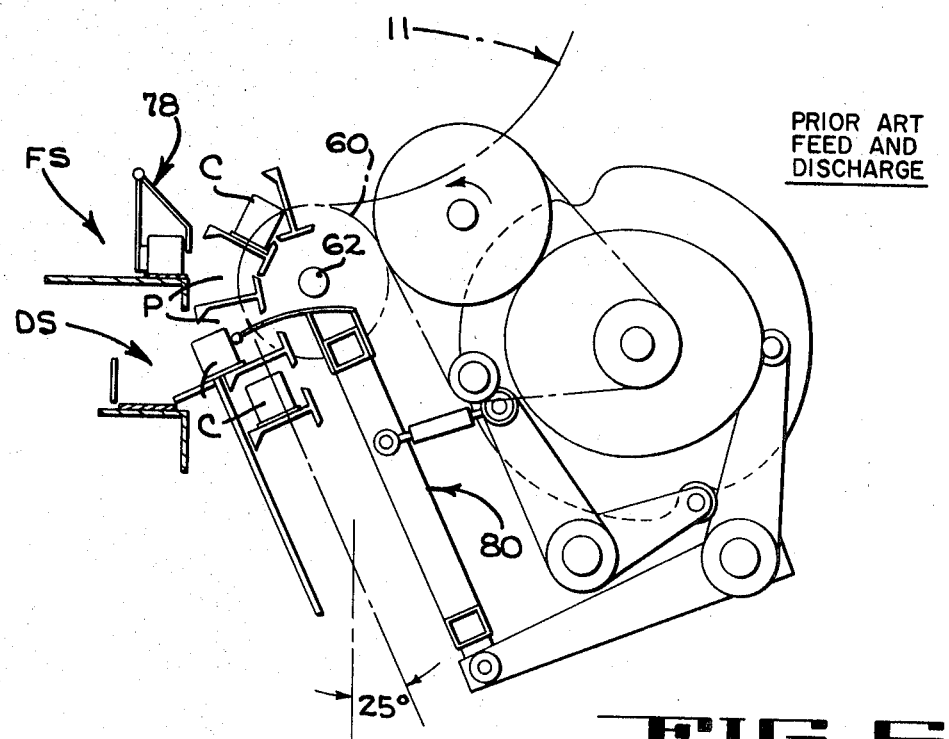
FIG_6
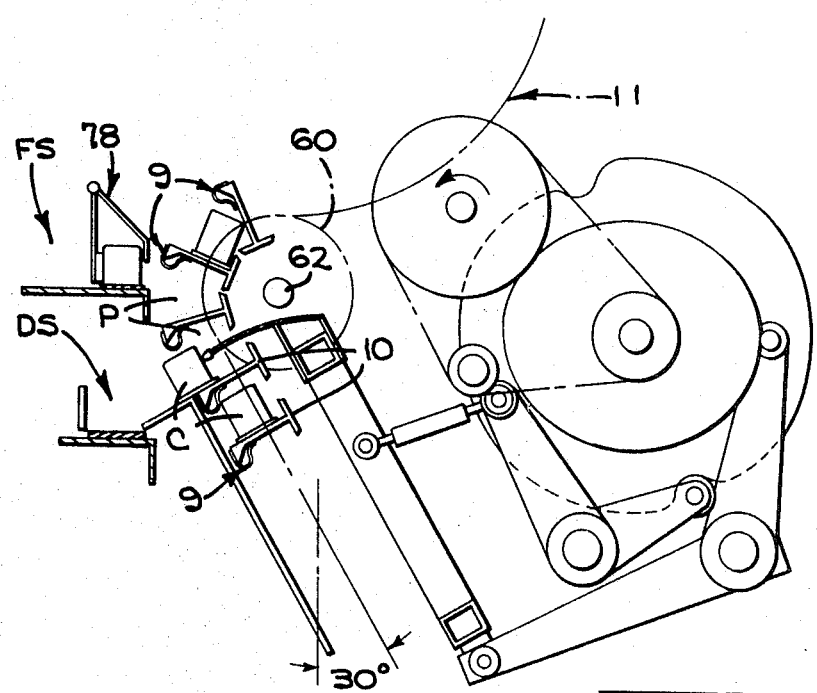
FIG_7

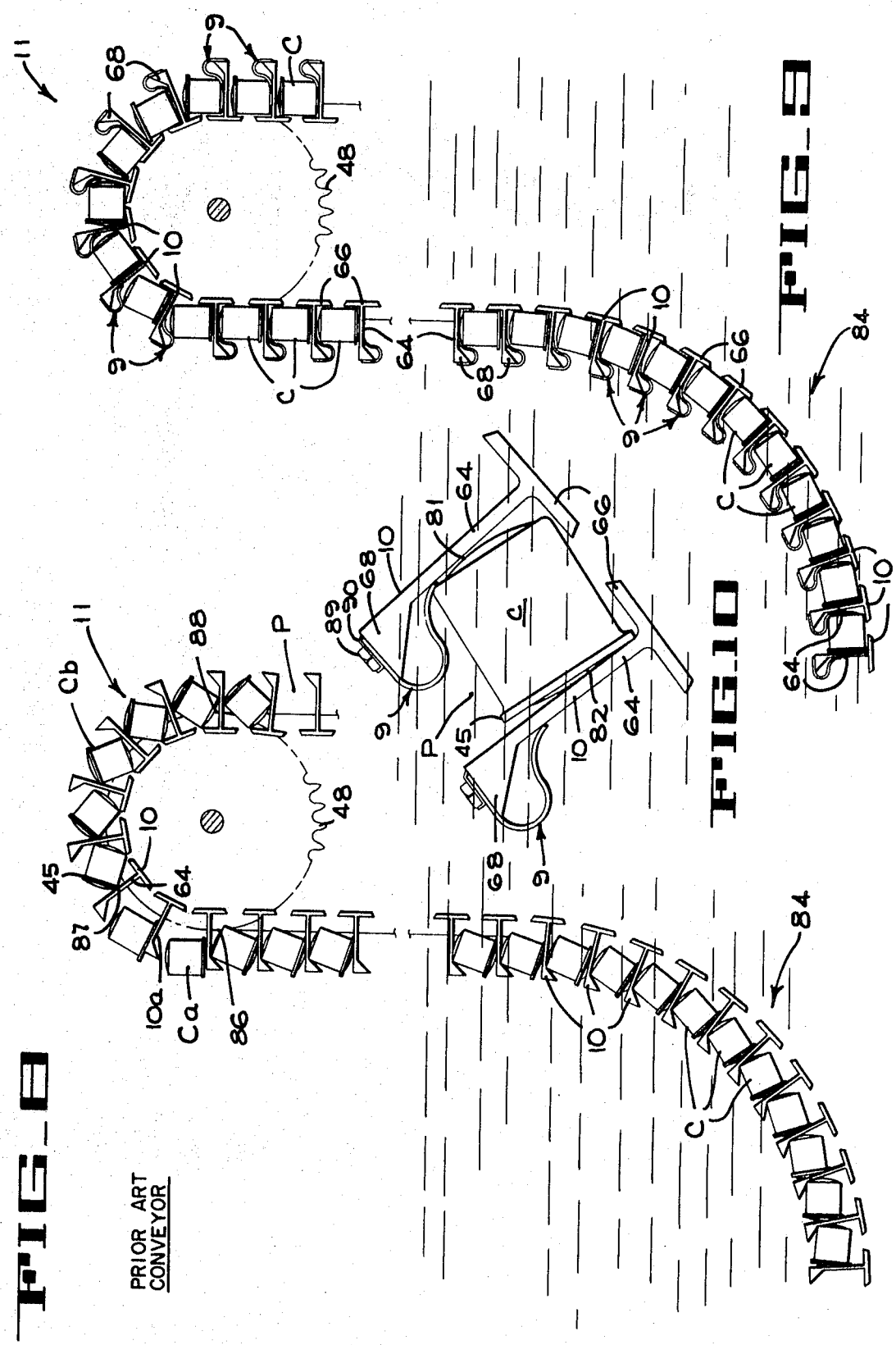

3,613,865

CONVEYING SYSTEM

CROSS-REFERENCE TO RELATED APPLICATIONS

The conveying system of the present invention may be used in conjunction with a hydrostatic cooker of the type disclosed in Reimers et al. application Ser. No. 795,283 filed on Jan. 30, 1969 which issued on Apr. 20, 1971 as U.S. Pat. No. 3,575,275 and is capable of handling containers, such as aluminum squat cans, supported on their ends as well as standard types of cylindrical containers supported on their cylindrical surfaces. The adapters may be used on alternate carriers of a single-processing conveyor which is fed by a multiple feed and discharge system similar to that disclosed in the Smith et al. application Ser. No. 785,174 filed on Dec. 19, 1968, and which issued as Pat. No. 3,568,816 on Mar. 8, 1971, if it is desired to simultaneously handle two or more separate food products or containers of two or more separate types or size ranges. Both of the above-mentioned application are assigned to the assignee of the present invention.

BACKGROUND OF THE INVENTION

1. Field of the Invention

This invention pertains to the cooker art and more particularly relates to a conveying system including adapters for carriers which are arranged to adapt the carriers to handle different types and a wider size range of food filled and sealed containers. The adapters are specifically arranged to handle squat aluminum cans supported on their ends.

2. Description of the Prior Art

It has been determined that the flat ends of relatively weak containers that are supported on their ends, such as aluminum squat cans, bow outwardly when processed at high temperatures in hydrostatic cookers. The outward bowing of the container walls makes it necessary to increase the spacing or pitch between adjacent carriers bars, as compared to the spacing required when processing containers that do not bow outwardly, so as to prevent wedging or pinching of the containers between adjacent carrier bars. When processing rows of squat cans on their ends in hydrostatic cookers having articulating carrier bars of the type disclosed in the above referred to Reimers et al. application, it has been determined that some of the cans shift within the carriers to positions wherein they become wedged between the webs and/or retaining flanges of the associated carriers. The loss of control of the cans is caused in part by the fact that some of the cans float when passing through water within the cooker, and that the space between the retaining surfaces of each pair of adjacent carrier bars is sufficient to allow the containers to shift within the carriers bars. Some of the containers shift to positions wherein they become frictionally locked in tilted position by being wedged between different carrier surfaces as the carriers move along a zigzag path through the cooker.

Adapters such as those disclosed in U.S. Pat. No. 3,286,619 which issued to Lee on Nov. 22, 1966 are unsuitable for squat cans supported on their ends since the adapters include can contacting surfaces which are effective only to reduce the space between adjacent carriers and do not reduce the width of the carriers. Thus, squat cans which move by flotation or otherwise into tilted position immediately adjacent the small flanges of their supporting carriers, may be pinched and damaged when the Lee carriers are moved around a portion of the path of travel which causes the outer flanges of the carriers to move closer together, i.e., to converge toward each other.

SUMMARY OF THE INVENTION

The conveying system of the present invention includes carrier bars which are mounted a sufficient distance apart to accommodate the swelling of the end walls of squat cans when the cans are supported on their ends. The adapters are each conveniently bolted to the narrow flanges of their associated carrier bars and include a generally S-shaped container contacting wall. The S-shaped wall enters the carrier pocket defined by adjacent carriers to decrease the space between adjacent flanges in a direction parallel to the direction of movement of the conveyor and to reduce the width or radial dimension of the pocket of a carrier. The S-shaped wall includes a concave container contacting camming surface having a radius of curvature which permits adjacent carrier bars to articulate relative to each other without moving squat cans which are properly positioned in the carriers. The concave surface and a steep internal leading portion of the adapter also defines a steep-camming surface which is substantially parallel to the longitudinal axis of its supporting links. These surfaces engage and cam any improperly positioned container away from the converging outer or narrow flanges of the carrier bars in response to the carrier bars moving along a portion of its path which moves the outer flanges of adjacent carriers toward each other thus precluding pinching of the containers. A relatively steep-camming surface is required to slide the containers along the supporting surface of the carrier bars because these surfaces become rather rough due to pitting and the formation of scale on the aluminum carrier bars, and because of the galling which occurs when aluminum containers slide along the aluminum carriers.

BRIEF DESCRIPTION OF THE DRAWINGS

FIG. 1 is a diagrammatic vertical section taken through a double-chain hydrostatic cooker having the conveyor system of the present invention associated therewith, certain parts being cut away.

FIG. 2 is a perspective of a fragment of the inner conveyor of the conveying system of FIG. 1 illustrating three carriers with their central portions cut away.

FIG. 3 is an enlarged vertical section taken along lines 3—3 of FIG. 2 illustrating two carrier bars having adapters bolted thereto and a squat can therein.

FIG. 4 is a perspective of a squat aluminum can illustrating the keyed end of the can when the ends are flat.

FIG. 5 is a vertical central section of a can with its ends bowed outwardly as occurs during heat treatment, the normal position of the end walls being shown in phantom lines and the food product within the can not being illustrated.

FIG. 6 is a diagrammatic vertical section illustrating the feed and discharge stations of a prior art cooker having a conveying system with the adapters removed.

FIG. 7 is a diagrammatic vertical section illustrating the feed and discharge station when the adapters are connected to the carrier bars.

FIG. 8 is a vertical section with parts broken away illustrating certain curved portion of the path of travel of the carrier bars without adapters illustrating the manner in which the containers become wedged in the conveyor.

FIG. 9 is a vertical section similar to FIG. 8 illustrating the manner in which the adapters retain control of the containers.

FIG. 10 is an enlarged section of a submerged portion of FIG. 9 illustrating two carrier bars confining a floating container therebetween.

DESCRIPTION OF THE PREFERRED EMBODIMENT

The conveying system 8 (FIGS. 1 to 3) of the present invention is specifically adapted to handle containers such as aluminum squat cans C (FIGS. 3 and 4) that are supported on their ends. It will be understood, however, that the conveying system is versatile in that it is also capable of handling cylindrical containers supported on their cylindrical surfaces when an adapter 9 is connected to each carrier or carrier bar 10 of a processing conveyor 11. The conveying system is also capable of handling larger containers supported on their cylindrical surfaces after removal of the adapters 9 from the carrier bars 10.

The conveying system 8 is associated with a double-chain hydrostatic cooker 12 (FIG. 1) of well known design, which cooker includes the inner processing conveyor 11 and an outer processing conveyor 11'. Since the problem solved by the adapters 9 of the present invention is more prevalent with the inner processing conveyor 11, only the inner conveyor will be described in detail. It will be understood, of course, that adapters may or may not be attached to the carriers of the outer conveyor 11' depending upon what type and size of containers the canner wishes to process.

The cooker 12 comprises a frame 3 that includes a pair of spaced vertical support walls 14 (only one being shown) that are supported in spaced parallel relationship. A housing 16 which extends between the two walls 14 has a closed upper end 18 and two depending walls 20 and 22 which cooperate with the two walls 14 to define a cooking chamber 24. The cooking chamber 24 is filled with steam from a valve conduit 25 at a predetermined cooking temperature and pressure, for example, at about 250° F. to 275° F. and 15 to 20 p.s.i. gauge. The lower end of the housing 16 opens into a water filled trough or chamber 26 which is formed by the two walls 14, a transverse horizontal plate 28 and the lower end portions of two transverse vertical walls 30 and 32. The wall 30 cooperates with another transverse wall 34 to define an inlet hydrostatic water leg 36, and the wall 32 cooperates with a transverse vertical wall 38 to provide an outlet hydrostatic leg 40. The hydrostatic legs 36 and 40 communicate with the chamber 26 and are filled with water from valve conduits 41 and 42 so as to create sufficient pressure to resist the pressure of steam in the cooking chamber 24. The inlet hydrostatic water leg 36 is thermostatically controlled to provide a gradually increasing water temperature from approximately 210° F. at its upper end to approximately the sterilizing temperature in the steam chamber at its lower end. The outlet water leg 40 is also thermostatically controlled to provide a gradually decreasing temperature from approximately the sterilizing temperature at its lower end to any suitable temperature below the boiling point of water, for example, 85° F. at its upper end. Steam is added to the water in the hydrostatic inlet water leg 36 to provide the desired temperature therein, and cooling water is directed into the outlet or cooling leg 40 by conduit 42 and is drained therefrom by valved conduit 43 to provide the desired cooling temperature therein. Additional cooling is provided by cascading cold water into the containers from a plurality of troughs 44, only two troughs being shown.

Rows of containers, such as the extruded aluminum squat cans C having a single chime or bead 45 (FIGS. 4 and 5) on the lower end of each can, are advanced through the hydrostatic cooker 12 by the processing conveyor 11. The above referred to articulating carriers or carrier bars 10 are secured to the conveyor 11 by conventional mounting brackets. The processing conveyor 11 is trained around pairs of sprockets 48 (FIG. 1) that are rotatably supported by the vertical walls 14, and guide rails (not shown) are secured to the cooker walls so as to guide the conveyor 11 along the circuitous path. The conveyor 11 is driven by a motor 52 which is connected to one or more of the pairs of sprockets 48 by a chain drive 54.

The processing conveyor 11 is also trained around a pair of small diameter sprockets 60 (FIGS. 1, 6 and 7) secured to a shaft 62 journaled on the frame 13 at a feed station FS and discharge station DS, which sprockets effect the opening of the articulating carriers 10 so as to receive and discharge rows of containers therefrom.

As best shown in FIGS. 2 and 3, each carrier bar 10 includes an elongated radial web 64 having a plurality of drain holes 65 therein spaced about 2 inches apart. An inner retaining flange 66 is integrally formed on one edge of the web and a generally V-shaped outer confining flange 68 is formed on the front or container-receiving edge of the radial web. The carrier bars 10 are connected to spaced parallel endless chains 70 and 72 of the precessing conveyor 11 by end brackets 74 and cooperating bolts 76 in a manner well known in the art.

A feed mechanism 78 (FIGS. 6 and 7) of the type fully disclosed in the aforementioned Reimers et al. application is disposed at the feed station FS for deflecting rows of containers to be processed into the carriers 10, and a discharge mechanism 80 is disposed at the discharge station DS for deflecting rows of processed containers out of the carriers. Since the feed and discharge mechanisms are fully disclosed in the prior application, these mechanisms will not be described in detail herein and reference may be had to said prior application for a description of the operation of the same. The only difference between the prior art discharge mechanism illustrated in FIG. 6 from the discharge mechanism 80 (FIG. 7) is that the upward run of the conveyor 11 which enters the discharge station DS is an angled 30° from the vertical whereas the equivalent angle in the prior art device of FIG. 6 is 25°. Thus, the narrow outer flanges 68 wherein the discharge system of FIG. 7 opens a sufficient amount to permit discharge of rows of containers C therefrom when the adapters 9 are connected to the outer flanges 68.

An import feature of the present invention is that the adapters 9 are mounted on the carrier bars 10 for the specific purpose of accommodating the carriers to controllably handle containers, such as the squat aluminum cans C, when the containers are supported on their end walls 81 and 82 which are normally substantially flat except for grooves which aid in opening the containers and strengthening the end walls. These end walls will hereinafter be referred to as normally flat end walls. The main problem in handling this type of container is that the normally flat end walls 81 and 82 (FIGS. 4 and 5) swell to assume the bowed position indicated in FIG. 5 during processing under high temperature and pressure. The wall 82 also includes a key 83 which extends outwardly upon swelling of the end wall 82 as illustrated in FIG. 5. Accordingly, the carriers must be placed a greater distance apart to accommodate this swelling than would normally be required when handling containers that are supported on their cylindrical surfaces in the usual manner.

Another problem in handling squat containers is that some, but not all, of the containers become buoyant partially due to the generation of gases within the containers during heat treatment and the resultant swelling of the end walls. Thus, the buoyant squat containers when supported in carriers without the adapters 9 connected thereto shift within their supporting carriers and float upwardly to tilted positions when moving upwardly around the curves 84 and 85 (FIG. 1) in the lower submerged portion of their path of travel as best illustrated by the curve 84 in FIG. 8.

Although it is not fully understood why the containers become wedged between the carrier bars 10 when the adapters 9 are not being used, it is believed that the following condition causes the problem. It is known that the carrier bars 10 become quite rough with age due to scale or the like formed on the carrier bars and due to the presence of the holes 65 therein. The downwardly bowed container end wall 82 and key 83 tend to cling to the rough surface of the carrier bars, and this clinging is possibly aided by additional swelling of the containers. Thus, an occasional container will remain in the tilted position until the tilted container reaches the tangent point 86 (FIG. 8) of the sprocket 48 thereabove.

At this time the upper carrier bar 10a releases the tilted container and the container, aided by its rounded lower end wall 82 and possibly further aided by the springing effect of the key 83 (FIG. 5), scoots outwardly of the carrier between the V-shaped flanges as illustrated by the container Ca in FIG. 8. Some of tilted containers C scoot entirely out of the carrier bars at this point and must eventually be removed from the cooker and be discarded. More frequently however a container will scoot to a position where it overlaps the edge of its supporting carrier bar 10 about five-eighths of an inch as shown in FIG. 8. Although most of the containers which assume this position will gravitate back into the carrier bars as the bars move over the top of the sprockets 48, it has been discovered that some of the containers cling to the carrier bars 10 and pivot about either the free end of the key 83 and/or the point of contact 87 between the container bead 45 and the web 64 of the associated carrier bar 10 as indicated in FIG. 8. It is believed that the point of contact 87 may coincide with one of the drain holes 65 in the carrier web 64 thus causing the container to pivot about this point. The other end of the mispositioned container then gravitates to the position illustrated by the container Cb and wedges in this position. When the mispositioned container Cb moves downwardly past the horizontal tangent point 88, the carrier bars 10 attempt to articulate to their normal closed position. If such mispositioned container is disposed near one of the chains 70 or 72 (FIG. 2) of the conveyor 11, the container Cb will be partially crushed. If the mispositioned container is positioned near the longitudinal midpoint of the carrier bars 10, which bars are about 7 feet long, the carriers will deflect and will be held open by the pinched or wedged container Cb. Thus, other containers within the pocket P defined by the associated carrier bars 10 will fall or float out of the carrier pockets P as the carrier bars 10 move along their zigzag path through the remaining portion of the cooker.

Although FIG. 8 illustrates a mispositioned container in every carrier bar 10, it will be understood that FIG. 8 is intended to show the progressive position assumed by one mispositioned container C as it moves through a portion of the cooker. In actual operation only one container out of several thousand containers will be so mispositioned.

In order to adapt the conveying system 8 of the present invention to handle a wide size range of containers while supported on their cylindrical surfaces and also to controllably support squat cans C that are supported on their ends, the adapters 9 are removably secured to the carrier bars. As mentioned previously, when the adapters 9 are removed from the carrier bars, which bars are spaced 3 ¼ inches apart and are 4 inches wide, the carrier bars 10 are adapted to handle containers supported on their cylindrical surfaces lying within the size range of between 2 11/16 and 3 inches in diameter. When the adapters 9 are connected to the carriers 10, the carriers are capable of supporting rows of containers supported on their cylindrical surfaces having a size range of between 2 ⅛ inch and 2 11/16 inches in diameter. When the adapters 9 are attached to the carrier bars 10, the carriers are also adapted to handle squat containers C that are 2 ½ inches tall, 2 7/16 inches in diameter and which have a single bead or chime 45 which is 2 ⅝ inches in diameter.

In order to mount the adapters 9 to the carrier bars for easy removal, the adapters are connected to the edges of the outer V-shaped flanges 68 of the carrier bars 10 by capscrews 89 (FIGS. 2 and 3) which are positively locked in place by washers 90 each of which has one edge portion flattened against the capscrew 89 and another portion flattened against an edge of the adapter 9 during assembly as illustrated in FIG. 3.

Each adapter 9 includes an external mounting flange 91 and an S-shaped wall 92 which projects into the pocket P defined by adjacent carrier bars 10 to reduce the size of the pocket. The S-shaped wall 92 includes a convex nose portion 93 connected to a concave portion 94 by a steep internal lead-in portion 95. The convex portion 93 serves to reduce the space between the V-shaped outer flanges 68 of adjacent carrier bars 10. The concave portion 94 and lead-in portion 95 serves to reduce the width of the pockets P, and also serves as a steeply sloping camming surface. This camming surface engages the curved edge of the easily dented aluminum container C at a point adjacent the flat end wall 81 when the conveyor 11 is moved around the curved portion of its path as the portions 84 and 85 (FIG. 1) in a direction which causes radial webs 64 to converge, i.e., causes the outer V-shaped flanges 68 to move closer together as indicated in the lower portion of FIG. 9. It will be noted that as the outer flanges 68 move toward each other, each squat can C is cammed to the right (FIG. 3) thus preventing the cans from tilting as illustrated in FIG. 8 or from being damaged by being squeezed between the V-shaped outer flange 68 of one carrier and the radial web 64 of the adjacent carrier.

When the carriers move around a curve in the opposite direction, such as about the sprocket 48 (FIG. 9) or about the lower curves 96 and 98 (FIG. 1), the radial webs 64 diverge therealong partially opening the carrier bars 10. At this time, the concave camming surface 94 and lead-in portion 95 of the adapter 9 prevents the containers from moving outwardly in the carrier pockets P to a position wherein they would be pinched when the carrier bars are returned to their parallel or straight line position.

In operation, when the canner decides to process squat cans C, he first bolts an adapter 9 (FIGS. 2 and 3) on each carrier 10 and locks the adapter in place by bending one side of each washer 90 against the capscrew 89 and the other side of the washer against an edge of the adapter 9. The heat treatment mediums are then introduced into the cooker 12 and are raised to the desired temperature and pressure, and the precessing conveyor 11 (FIG. 1) is started and is continuously driven by the motor 52. Rows of squat cans C are deflected into the carriers 10 at the feed station FS by the feed mechanism 78 (FIG. 7), and after being processed are discharged from the carriers 10 at the discharge station DS by the discharge mechanism 80. It will be understood, of course, that the discharge mechanism 80 is not required when handling containers that are supported on their cylindrical surfaces since these containers will gravitate out of the carrier pockets P at the discharge station DS.

During the travel of the carrier bars 10 and the squat containers C along their zigzag path through the processing chambers of the cooker 12, the carrier bars are periodically articulated between their parallel container confining positions illustrated in FIG. 3, a potential pinching or convergent position with the adapters 9 moved toward each other as illustrated in the lower curved portion 84 of FIG. 9, and a divergent position wherein the adapters 9 are moved away from each other as illustrated in the upper curved portion of FIG. 9. When the carrier bars 10 are articulated from their normal position to the convergent position shown in the lower portion of FIG. 9, the lead-in portion 95 and concave surface 94 of the adapter 9 cams the container C toward the inner flanges 66 and, accordingly, prevents such pinching or uncontrollable tilting of the containers C. When the carrier bars 10 are pivoted in the opposite direction as illustrated in the upper portion of FIG. 9, the concave surface 94 and lead-in portion 95 serves to restrict the movement of the containers in the carrier bars thus preventing the containers from moving to the position where subsequent articulating movement in the opposite direction would cause pinching.

It will be understood that during the time the conveyor 11 is carrying squat cans C through the cooker 12, conveyor 11' will also be driven to carry other rows of containers through the cooker. Adapters 9 may or may not be connected to the carriers of conveyor 11' depending upon what type of containers are to be processed.

From the foregoing description it is apparent that the adapters 9 are primarily intended for use on carriers when handling squat containers supported on their ends when the containers are constructed of a material which is relatively weak and which bow outwardly when processed at high temperature. It will be understood, however, that the adapters may be used with containers supported on their cylindrical surfaces and may also be removed to adapt the carriers to handle a larger size range of containers than was heretofore possible.

Although the best mode contemplated for carrying out the present invention has been herein shown and described, it will be apparent that modification and variation may be made without departing from what is regarded to be the subject matter of the invention.

I claim:

1. In a cooker or the like having a processing chamber including water maintained at a high temperature comprising an endless conveyor including a pair of endless chains formed from articulating links; a plurality of spaced carrier bars connected to associated ones of said links with the space between adjacent carrier bars defining a container receiving pocket for accommodating rows of containers; each carrier bar including a radial web, a retainer flange on the radial inner edge of said web, and relatively low confining flange on the outer edge of said web; means for driving said conveyor along a zigzag path through said processing chamber and past a feed station and discharge station and for causing the carrier bars to articulate between a divergent position, a parallel position, and a convergent position for passing through the water; the improvement which comprises adapters overlying said confining flanges, each of said adapters including a concave inner camming surface for smoothly forcing the associated container portions radially inwardly when the carrier bars are articulated in their converging position thereby precluding pinching of the containers between adjacent carriers.

2. The cooker of claim 1, wherein said adapters have steep can lead-in portions converging with their camming surfaces.

3. The cooker of claim 1, wherein said adapters comprise a convex nose leading to a steeply inclined internal can lead-in portion, the latter leading to a concave internal container camming portion.

4. An apparatus according to claim 1 wherein said carrier bars are all of the same size and are spaced equal distances apart.

5. An apparatus according to claim 1 wherein all of the adapters are the same size and an adapter is mounted on each carrier bar.

6. An apparatus according to claim 1 wherein the adapters define an S-shaped wall and wherein the S-shaped wall extends over at least a portion of the outer confining flange and serves to increase the effective size of said flange.

7. An apparatus according to claim 1 wherein said adapter is secured to the outer edge of the outer confining flange of the associated carrier bar by a plurality of capscrews for ease in installation and removal.

8. An apparatus according to claim 7 wherein said capscrew is locked in place by a flat washer which has one end portion bent firmly against the capscrew and another portion bent over an edge of the adapter during assembly.

9. An apparatus according to claim 6 wherein each adapter is secured to the outer edge of the outer confining flange of the associated carrier bar by a plurality of capscrews for ease in installation and removal.

10. An apparatus according to claim 1 wherein the rows of containers are squat aluminum cans supported on their ends.